United States Patent
Roeder et al.

(10) Patent No.: US 6,929,579 B2
(45) Date of Patent: Aug. 16, 2005

(54) METHOD FOR OPERATING A VEHICLE DRIVE DEVICE WITH DEVICE WITH A CONTINUOUSLY VARIABLE TRANSMISSION (CVT) IN A BRAKE-ENGAGING MODE

(75) Inventors: Oswin Roeder, Vohburg (DE); Horst Wild, Engelthal (DE)

(73) Assignee: Conti Temic microelectronic GmbH, Nuremberg (DE)

(*) Notice: Subject to any disclaimer, the term of this patent is extended or adjusted under 35 U.S.C. 154(b) by 61 days.

(21) Appl. No.: 10/297,448

(22) PCT Filed: May 16, 2001

(86) PCT No.: PCT/EP01/05539

§ 371 (c)(1),
(2), (4) Date: Jul. 22, 2003

(87) PCT Pub. No.: WO01/94146

PCT Pub. Date: Dec. 13, 2001

(65) Prior Publication Data

US 2004/0053741 A1 Mar. 18, 2004

(30) Foreign Application Priority Data

Jun. 6, 2000 (DE) .......................... 100 27 602
Sep. 15, 2000 (DE) .......................... 100 45 625

(51) Int. Cl.⁷ ............................................. B60K 41/62
(52) U.S. Cl. ........................ 477/40; 477/115; 477/203
(58) Field of Search ............................. 477/37, 40, 44, 477/92, 97, 115, 203

(56) References Cited

U.S. PATENT DOCUMENTS 4,126,200 A * 11/1978 Miller et al. .................. 477/52
5,218,541 A    6/1993 Sakakibara et al.
5,893,816 A *  4/1999 Ashida ....................... 477/111
6,226,583 B1 * 5/2001 Iwata .......................... 477/97

FOREIGN PATENT DOCUMENTS

| DE | 3632960 | * 4/1988 | ............... 477/97 |
| DE | 19946425 | 5/2000 | |
| EP | 0875414 | 11/1998 | |
| EP | 0896895 | 2/1999 | |
| JP | 03-70638 | * 3/1991 | ............... 477/92 |
| JP | 03204459 | 9/1991 | |
| JP | 08020265 | 1/1996 | |

* cited by examiner

Primary Examiner—Ha Ho
(74) Attorney, Agent, or Firm—W. F. Fasse; W. G. Fasse

(57) ABSTRACT

A motor vehicle drive arrangement including a motor and a stepless automatic transmission for driving drive wheels has a normal operating mode for normal driving operation and a brake engagement operating mode for a situation of excessive slip of a drive wheel. During the brake engagement operating mode, strong fluctuations of the transmission ratio could arise, or the vehicle might drive with a low motor torque but a high drive rotational speed, which are uncomfortable for the driver. To increase driving comfort, a normal motor torque value is prescribed in the normal operating mode, and in the brake engagement operating mode the motor torque is reduced to an actual motor torque value. A difference torque is determined between the normal and actual motor torque values. A maximum desired nominal drive rotational speed is varied dependent on the difference torque.

7 Claims, 1 Drawing Sheet

METHOD FOR OPERATING A VEHICLE DRIVE DEVICE WITH DEVICE WITH A CONTINUOUSLY VARIABLE TRANSMISSION (CVT) IN A BRAKE-ENGAGING MODE

FIELD OF THE INVENTION

The invention relates to a method for operating a drive arrangement of a motor vehicle.

BACKGROUND INFORMATION

The drive arrangements of motor vehicles typically comprise a motor and a transmission, by which the motor torque is transmitted to the drive wheels. Additionally, it is typical to provide brake control devices for special braking functions. Such braking functions are known, for example, by the names or terms: antislip regulation (ASR), electronic differential locking (EDS), and electronic stability program (ESP). The special braking functions are active when one or more of the wheels of the motor vehicle comprise a slip that exceeds a certain or determined value.

In a motor vehicle with a stepless automatic transmission, the transmission ratio of the automatic transmission is variable in a stepless manner and thus makes it possible to achieve the optimum utilization of the motor torque. For this purpose, the transmission ratio is regulated with a transmission controller or regulator, whereby the regulation can be carried out according to certain predefined strategies. If an increased slip now arises on one of the drive wheels, then this can lead to an increase of the regulation deviation in the transmission controller. The transmission controller would attempt to regulate-out this regulation deviation, which would lead to rapid changes of the transmission ratio and therewith to rapid changes of the moments or torques of the drive wheels. Rapid changes of the moments or torques of the drive wheels would, however, impair the effectiveness of the braking functions and lead to a repeated activation and deactivation of the braking functions. In order to avoid this disadvantage, a change or variation of the transmission ratio of the automatic transmission is prevented, as long as one of the braking functions is active.

This has as a result, that the motor torque will be sharply reduced by the antislip regulation for a long continuing period, but the motor rotational speed will continue to remain at a high level, during a longer drive on a driving path or roadway with a low coefficient of friction, for example a roadway covered with snow or ice, especially for a drive with a high driving or accelerator pedal angle, i.e. with a high acceleration desire of the driver. This leads to a bothersome high motor noise.

SUMMARY OF THE INVENTION

It is the basic underlying object of the invention to provide a method for operating a drive arrangement of a motor vehicle, which makes possible an improvement of the driving comfort with effective braking functions.

The object is achieved according to the invention in a method of operating a drive arrangement of a motor vehicle.

In the inventive method, the drive wheels of a motor vehicle are driven via a stepless automatic transmission by a motor, whereby a normal operating mode is prescribed for the normal driving operation and a brake engagement operating mode is prescribed for the case that a slip of at least one of the drive wheels exceeding a certain value is detected. In the normal operating mode, a normal motor torque value is prescribed as the desired nominal value of the motor torque of the motor. In the brake engagement operating mode, the motor torque is reduced to an actual motor torque value that is smaller relative to the normal motor torque value, by a motor engagement or intervention effectuated by a braking function. Furthermore, in the brake engagement operating mode, the difference between the normal motor torque value and the actual motor torque value is determined as the difference torque, and a maximum desired nominal drive rotational speed for the drive rotational speed of the automatic transmission is prescribed dependent on the difference torque. In this context, the drive rotational speed is understood to refer to the motorside rotational speed of the automatic transmission, which is equal to the motor rotational speed with a closed clutch.

Preferably, the maximum desired nominal drive rotational speed in the brake engagement operating mode is prescribed in such a manner that it is continuously reduced in connection with a value of the difference torque that exceeds a first threshold value, whereby the reduction advantageously is carried out with a prescribable speed of change or variation, and whereby preferably a minimum drive rotational speed dependent on the driving speed, as a lower limit of the maximum desired nominal drive rotational speed, is not fallen below.

In an advantageous further development of the method, a second threshold value lying below the first threshold value is defined as a further threshold value, and, in connection with a value of the difference torque that falls below the second threshold value, the maximum desired nominal drive rotational speed of the automatic transmission varies in such a manner that it is increased continuously up to a certain boundary or limit value, whereby this increase is preferably carried out with a speed that is dependent on the variation or change speed of the difference torque.

Advantageously, the maximum desired nominal drive rotational speed is fixedly maintained at a constant value in connection with a difference torque lying between the first and second threshold values.

The inventive method comprises the following advantages:

- it ensures a low fuel consumption during longer drives with active braking functions, because the motor is not operated with unnecessarily high drive rotational speeds;
- the driving comfort is improved by the reduction of the motor noises, because the motor is not operated with a low motor torque and nonetheless a high drive rotational speed;
- a better support of the braking functions is ensured, because these are not repeatedly activated and deactivated, and a torque reserve adequate for the regulation is made available to these braking functions.

BRIEF DESCRIPTION OF THE DRAWINGS

In the following, the invention will be described in further detail in connection with an example embodiment and the Figures. It is shown by.

Figures 1, 2:
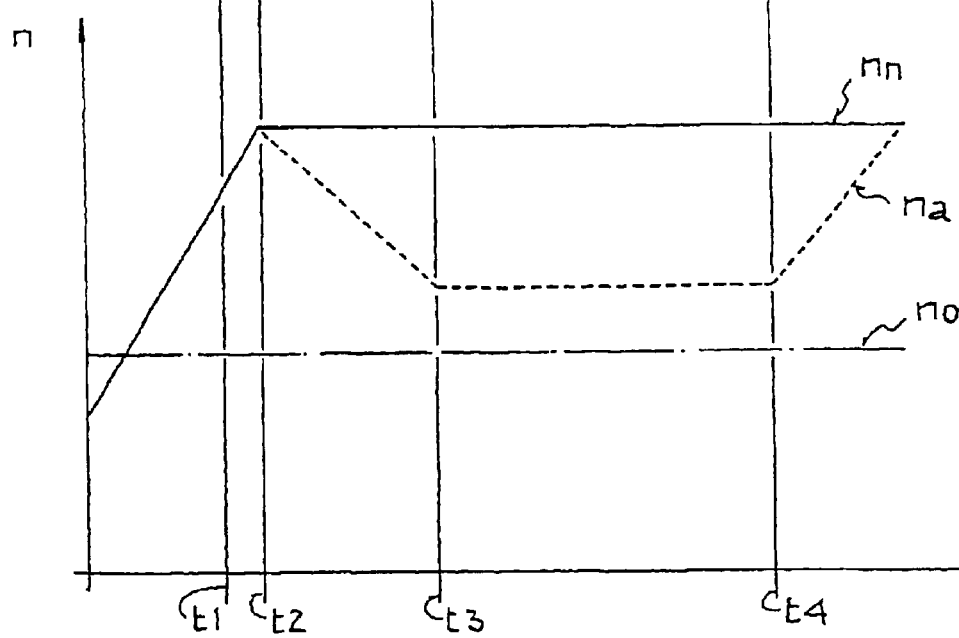
FIG. 1 a time diagram of the motor torques.
FIG. 2 a time diagram of the drive rotational speeds.

DETAILED DESCRIPTION OF A PREFERRED EXAMPLE EMBODIMENT AND OF THE BEST MODE OF THE INVENTION

The inventive method is utilized for operating the drive arrangement of a motor vehicle, which comprises a motor as well as a stepless automatic transmission, that is to say a transmission with a stepless variable transmission ratio. In the control of the drive arrangement, a distinction is made between a normal operating mode and a brake engagement operating mode, whereby the normal operating mode is provided for the normal driving operation and the brake engagement operating mode is provided for the case that a slip exceeding a certain value arises on one of the drive wheels of the motor vehicle, which leads to the activation of a braking function. Next, the control of the drive arrangement will be described in further detail for a certain driving situation.

In connection with the curve Mn, FIG. 1 shows the course or progression of a motor torque value that is designated as a normal motor torque value in the following, and that one would obtain as the desired nominal value of the motor torque or moment M in the normal operating mode for the certain driving situation. In this context, this refers to a value that is determined dependent on the driving or accelerator pedal angle or throttle flap angle that prescribes the drivers wishes, and dependent on various operating parameters of a motor control device, for example in connection with a characteristic value field or performance graph.

At the time point t1, a high slip arises on one of the drive wheels, and the antislip regulation becomes active as a braking function. Thereby, the wheel rotational speed and therewith also the wheel torque on the drive wheels is controlled by a brake control device. With the activation of the braking function, the drive arrangement is also switched to the brake engagement operating mode, and the motor torque M is reduced to an actual motor torque value Ma by the braking function acting on the motor control device.

During the brake engagement operating mode, the difference between the normal motor torque value Mn and the actual motor torque value Ma is determined as the difference torque Md, and the maximum desired nominal drive rotational speed is varied dependent on the difference torque Md in such a manner, that the difference torque Md does not rise too high, so that there will nonetheless still be an adequate torque reserve remaining for the control or regulation carried out by the braking function, without giving rise to the danger that the braking function will be repeatedly activated and deactivated within a short time.

In the brake engagement operating mode, the wheel rotational speed of the drive wheels is determined by the braking function, so that the drive rotational speed is controlled by variation of the transmission ratio of the automatic transmission. Thereby, the motor torque M is adjusted to the desired value by the motor control device.

In FIG. 2, the curve nn illustrates the course or progression of the maximum normal desired nominal drive rotational speed, which one obtains as the maximum value of the desired nominal drive rotational speed n in the normal operating mode, and the curve na illustrates the course or progression of the maximum desired nominal drive rotational speed in the brake engagement operating mode.

According to FIG. 2, the maximum desired nominal drive rotational speed na in the brake engagement operating mode is reduced as soon as the difference torque Md has exceeded a first threshold value M1, namely at the time point t2. In this context, the reduction is carried out with a certain variation or change speed and continues until the difference torque Md again falls below the first threshold value M1. This occurs at the time point t3. Thereby, a minimum drive rotational speed n0, which is dependent on the driving speed, is prescribed as the lower limit of the maximum desired nominal drive rotational speed na. The prescribing or specifying of this minimum drive rotational speed n0 is carried out in such a manner that for the current driving speed, no unexpectedly high drive rotational speed changes will arise or unexpectedly low drive rotational speeds will occur for the driver.

Beginning from the time point t3, the maximum desired nominal drive rotational speed na is held constant until the time point t4, namely so long until the difference torque Md falls below a second threshold value M2 lying below the first threshold value M1. This second threshold value M2 is selected in such a manner that the torque reserve corresponding to the difference torque Md in the time interval t2 to t4 is sufficiently large, to ensure a reliable performance of the braking function, so that the braking function is not repeatedly activated and deactivated within a short time, which would lead to an unsteady rotational speed behavior. The first threshold value M1 is then selected in such a manner so that a hysteresis-formed operating behavior results from the spacing between the two threshold values M1, M2, so that the maximum desired nominal drive rotational speed Ma does not constantly change or vary with respect to its value.

Beginning at the time point t4, the maximum desired nominal drive rotational speed na increases with a prescribable increasing speed, up to the maximum normal desired nominal drive rotational speed nn as a limit value.

This increasing speed is specified or prescribed dependent on the time change or variation of the difference torque Md in such a manner so that the maximum desired nominal drive rotational speed na increases with an increased rise or increasing speed, when the difference torque Md rises or increases very quickly, for example due to a sudden shock-like increase of the coefficient of friction of the roadway or driving path. Thereby, upon the deactivation of the braking function, that is to say upon switching over into the normal operating mode, it is ensured that the maximum desired nominal drive rotational speed na is equal to the maximum normal desired nominal drive rotational speed nn or is at least in the proximity thereof. For example, a threshold for the change or variation speed of the difference torque Md can be defined, and it can be tested whether the change or variation speed of the difference torque Md is larger or smaller than the defined threshold. The rise or increase speed of the maximum desired nominal drive rotational speed na may then be switched-over between two values depending on the comparison result, whereby these values are distinguished from one another by the factor of 2, for example, whereby the switching-over is carried out in such a manner that a rapid change or variation of the difference torque Md also has a rapid change of the maximum desired nominal drive rotational speed na as a result.

What is claimed is:

1. Method for operating a drive arrangement of a motor vehicle, in which drive wheels of the motor vehicle are driven by a motor via a stepless automatic transmission, comprising prescribing a normal operating mode for a normal driving operation, prescribing a brake engagement operating mode for a case in which a slip exceeding a certain value is detected on at least one of the drive wheels, prescribing a normal motor torque value (Mn) as a desired nominal value of a motor torque (M) of the motor in the normal operating mode, and in the brake engagement operating mode, reducing the motor torque (M) relative to the normal motor torque value (Mn) to an actual motor torque value (Ma), determining a difference between the normal motor torque value (Mn) and the actual motor torque value (Ma) as a difference torque (Md), and prescribing a maximum desired nominal drive rotational speed (na) for a drive rotational speed (n) of the automatic transmission dependent on the difference torque (Md).

2. Method according to claim 1, characterized in that the maximum desired nominal drive rotational speed (na) is reduced in the brake engagement operating mode, in connection with a value of the difference torque (Md) exceeding a first threshold value (M1).

3. Method according to claim 2, characterized in that the reduction of the maximum desired nominal drive rotational speed (na) is carried out with a prescribable change speed.

4. Method according to claim 2, characterized in that a second threshold value (M2) lying below the first threshold value (M1) is defined, and in that the maximum desired nominal drive rotational speed (na) is increased in connection with a value of the difference torque (Md) falling below the second threshold value (M2).

5. Method according to claim 4, characterized in that the increase of the maximum desired nominal drive rotational speed (na) is carried out with an increase speed that is dependent on a change speed of the difference torque (Md).

6. Method according to claim 4, characterized in that the maximum desired nominal drive rotational speed (na) is held constant in connection with a value of the difference torque (Md) lying between the first and second threshold values (M1, M2).

7. Method according to claim 1, characterized in that a minimum drive rotational speed (n0) dependent on a driving speed of the motor vehicle is prescribed as a lower limit for the maximum desired nominal drive rotational speed (na).

* * * * *

UNITED STATES PATENT AND TRADEMARK OFFICE
CERTIFICATE OF CORRECTION

PATENT NO. : 6,929,579 B2
DATED : August 16, 2005
INVENTOR(S) : Roeder et al.

Page 1 of 1

It is certified that error appears in the above-identified patent and that said Letters Patent is hereby corrected as shown below:

Title page, Item [54] and Column 1, Lines 1-5,
Title, replace "METHOD FOR OPERATING A VEHICLE DRIVE DEVICE WITH DEVICE WITH A CONTINUOUSLY VARIABLE TRANSMISSION (CVT) IN A BRAKE-ENGAGING MODE" with -- METHOD FOR OPERATING A VEHICLE DRIVE WITH DEVICE WITH A CONTINUOUSLY VARIABLE TRANSMISSION (CVT) IN A BRAKE-ENGAGING MODE --.

Column 3,
Line 20, after "prescribes the" replace "drivers" by -- driver's --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,929,579 B2  Page 1 of 1
DATED : August 16, 2005
INVENTOR(S) : Roeder et al.

It is certified that error appears in the above-identified patent and that said Letters Patent is hereby corrected as shown below:

Title page,
Item [54], Title, replace "METHOD FOR OPERATING A VEHICLE DRIVE DEVICE WITH DEVICE WITH A CONTINUOUSLY VARIABLE TRANSMISSION (CVT) IN A BRAKE-ENGAGING MODE" with -- METHOD FOR OPERATING A VEHICLE DRIVE DEVICE WITH A CONTINUOUSLY VARIABLE TRANSMISSION (CVT) IN A BRAKE-ENGAGING MODE --.

Column 1,
Line 2, after "DRIVE DEVICE" delete "WITH DEVICE".

Column 3,
Line 20, after "prescribes the" replace "drivers" with -- driver's --.

This certificate supersedes Certificate of Correction issued December 27, 2005.

Signed and Sealed this

Eighteenth Day of April, 2006

JON W. DUDAS
*Director of the United States Patent and Trademark Office*